(12) United States Patent
Matsumoto et al.

(10) Patent No.: US 7,763,667 B2
(45) Date of Patent: Jul. 27, 2010

(54) POLYMER WITH DISPERSED FINE METAL PARTICLES, METHOD FOR PRODUCING SAME, METAL ION-CONTAINING POLYMER FOR USE IN SAME PRODUCTION, AND METHOD FOR PRODUCING SAME

(75) Inventors: Akikazu Matsumoto, Kawachinagano (JP); Toru Odani, Sendai (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 12/591,578

(22) Filed: Nov. 24, 2009

(65) Prior Publication Data
US 2010/0076141 A1 Mar. 25, 2010

Related U.S. Application Data

(62) Division of application No. 10/527,711, filed as application No. PCT/JP03/11597 on Sep. 10, 2003, now Pat. No. 7,645,811.

(30) Foreign Application Priority Data
Sep. 12, 2002 (JP) .............................. 2002-267341

(51) Int. Cl.
C08G 79/00 (2006.01)
(52) U.S. Cl. ...................................... 521/153; 423/403
(58) Field of Classification Search .................. 521/153
See application file for complete search history.

(56) References Cited

U.S. PATENT DOCUMENTS

2002/0145132 A1 10/2002 Won et al.
2004/0072015 A1 4/2004 Selta et al.
2005/0038284 A1 2/2005 Matsumoto et al.

FOREIGN PATENT DOCUMENTS

| JP | 37-18895 | 12/1962 |
| JP | 2001-072881 | 3/2001 |
| JP | 2002-179931 | 6/2002 |
| JP | 2003-146944 | 5/2003 |

OTHER PUBLICATIONS

"Intercalation of alkylamines into an organic polymer crystal" Matsumoto et al, Nature, vol. 405, May 18, 2000, pp. 328-330.*

(Continued)

*Primary Examiner*—Vasu Jagannathan
*Assistant Examiner*—Doris L Lee
(74) *Attorney, Agent, or Firm*—Harness, Dickey & Pierce, P.L.C.

(57) ABSTRACT

A lamellar crystalline organic polymer containing acidic groups and/or ammonium salt thereof, such as ammonium salt of polymuconic acid, is mixed with a substance containing a metal ion such as alkali metal ion, to prepare a metal ion-containing polymer having a structure in which the metal ion is intercalated between the layers of the lamellar crystalline organic polymer having acidic groups. Subsequently, metal ion exchange reaction is conducted if necessary. Thereafter, the metal ion is reduced to produce fine metal particles. Thus, a crystalline organic polymer in which fine metal particles are dispersed in a crystalline organic polymers obtained.

6 Claims, 12 Drawing Sheets

OTHER PUBLICATIONS

"Silver clusters intercalation into the cellulose matrix" Kotelnikova et al, Cellulose Chem. Technology, 36, 5-6. 445-458 (2002).*

Akikazu Matsumoto. "Polymer Synthesis with the Use of Crystallizing Reaction." Chemical Device. Mar. 2002. vol. 44, No. 3, and partial English translation thereof.

Japanese Office Action and English translation thereof.

"Electronic Functional Materials", The Society of Polymer Science Japan, Kyoritsu Shuppan Co., Ltd., 1992, pp. 279-290.

"Polymer Complex", written by Naoki Tojima et al., edited by The Society of Polymer Science Japan, New Material for Polymers: One Point-25, Kyoritsu Shuppan Co., Ltd., 1990, pp. 1-13.

"Inorganic/ Organic Nano Composite Materials", The Chemical Society of Japan, Kagakusosetsu, Quarterly, No. 42, Japan Scientific Societies Press, 1999, pp. 135-159.

"Preparation of Noble Metal Nanoparticles Using a Cationic Isonitrile Protectant", Tetsu Yonezawa, Polymer Processing, vol. 51, No. 8, Aug. 2002, pp. 343-347.

"Synthesis of Organic Interlayer Compounds by Solvent-Free Process", Toru Odani et al., Material Stage, vol. 1, No. 11, Technical Information Institute Co., Ltd, Feb. 2002, pp. 48-52.

"Solvent-Free Synthesis of Layered Polymer Crystals", Toru Odani et al., Polymer Journal, vol. 34, No. 11, 2002, pp. 841-846.

"Intercalation of alkylamines into an organic polymer crystal" Matsumoto et al., Nature, vol. 405, May 18, 2000, pp. 328-330.

"Silver cluster intercalation into the cellulose matrix" Kotelikova et al., Cellulose Chem. Technology, 36, 5-6, pp. 445-458 (2002).

International Search Report.

* cited by examiner

_US 7,763,667 B2_

POLYMER WITH DISPERSED FINE METAL PARTICLES, METHOD FOR PRODUCING SAME, METAL ION-CONTAINING POLYMER FOR USE IN SAME PRODUCTION, AND METHOD FOR PRODUCING SAME

PRIORITY STATEMENT

This application is a divisional application of U.S. application Ser. No. 10/527,711, filed Oct. 3, 2005, the entire contents of which are incorporated herein by reference, which is a national phase application of International Patent Application No. PCT/JP2003/011597, filed Sep. 10, 2003, the entire contents of which are incorporated herein by reference.

TECHNICAL FIELD

The present invention relates to a polymer with dispersed fine metal particles, in which the fine metal particles are dispersed in an organic polymer and which is suitably applicable as an antibacterial agent, antifungal agent, oxidation catalyst, reaction catalyst (such as an isomerization catalyst, hydrogenation catalyst, hydroformylation catalyst, hydrosilylation catalyst and the like), optical material, electronic material and the like. The present invention also relates to a method for producing the polymer with dispersed fine metal particles. In addition, the present invention relates to a metal ion-containing organic polymer (in which a metal ion is contained) which is suitable as an intermediate product used in the production of the polymer with dispersed fine metal particles, and which itself is also suitably applicable as an antibacterial agent, antifungal agent, oxidation catalyst, and reaction catalysts, and the like. The present invention furthermore relates to a method for producing the metal ion-containing organic polymer.

BACKGROUND ART

A number of studies are directed to complexation of an organic material and an inorganic material. There have developed some organic/inorganic composite materials prepared by complexation of inorganic substances and an organic polymers.

As for organic polymers capable of containing a metal ion as a guest substance, it has been widely known that polyethylene oxide, compounds similar thereto, and graft polymers containing, as its side chain, polyethylene oxide or a compound similar to polyethylene oxide are organic polymers capable of containing, as a guest substance, a metal ion such as an alkali metal ion. Polyethylene oxide, compounds similar thereto, and graft polymers containing, as its side chain, polyethylene oxide or a compound similar to polyethylene oxide are utilized as ion-conducting materials (Reference 1: Electronic Materials, ed. by the Society of Polymer Science Japan, Kyoritsu Shuppan Co., Ltd., pp. 279-290 (1992)).

High-molecular-weight organic metal complexes in which a transition metal such as copper, iron, cobalt, rhodium or the like is coordinate-bond with a polymer ligand are also known. (Reference 2: Naoki TOJIMA, Masao KANEKO and Mitsuo SEKINE, New Material for Polymers One Point-25, Polymer Complex, Kyoritsu Shuppan Co., Ltd., pp. 1-13, especially FIGS. 1.2 of page 4 (1990)) Such organic metal complexes with high molecular weight have the following properties: they are ease to be handled as raw materials, forming a complex to prepare them is easy, and they are highly effective. Examples of their functions are a synthesizing function (as catalysts, reagents), separating function, physiological function and physical function, and other functions.

Furthermore, various techniques to prepare an organic polymer containing fine metal particles by forming a complex with an organic polymer and fine particles of silver or gold are known. For example, (1) producing super lattice structure having a distinct structure by way of absorbing gold colloid and a cationic polymer alternatively, (2) physically synthesizing a polymer-metal nanoparticle complex by (i) preparing a metal nanoparticle through vacuum deposition, (ii) trapping the metal nanoparticle under a low temperature, and then (iii) stabilizing the metal nanoparticle by using the polymers, and (3) chemically synthesizing a polymer-metal nanoparticle complex by reducing a metal ion such as a gold ion, platinum ion, palladium ion, rhodium ion or iridium ion, using a reducing agent in the presence of a polymer stabilizer such as poly(N-vinyl-2-pyrrolidone)(PVP) or the like, (4) and other methods (Reference 3: Inorganic/Organic Nano Composite materials, Kagakusosetsu, Quarterly, No. 42, ed. The Chemical Society of Japan, Japan Scientific Societies Press, pp. 135-159 (1999)). It is also known to prepare a noble metal nanoparticle using a cationic isonitrile protectant having a relatively high molecular weight (having a hydrocarbon chain of 6 to 12 carbon numbers) (Reference 4: Tetsu YONEZAWA, Preparation of Noble Metal Nanoparticles Using a Cationic Isonitrile Protectant, Polymer Processing, vol. 51, No. 8, August, 2002 issue, pp. 343-347).

Some organic/inorganic composite materials containing a lamellar structure produced through intercalation are also known, though they are not many. For example, some organic/inorganic composite materials are also known wherein an inorganic lamellar substance such as graphite, a clay mineral, a metal oxide or the like is used and an organic substance is intercalated therein as guest molecules.

As another approach, the inventors of the present inventions and others reported recently that a lamellar crystalline organic polymer containing a carboxyl group can work as a host compound during intercalation and that the lamellar crystalline organic polymer can reversibly take (intercalate) an organic guest molecule such as an alkyl amine into a crystal thereof, the lamellar crystalline organic polymer obtained by crystalline polymerization of a muconic acid derivative or a sorbic acid derivative (Reference 5: Toru ODANI and Akikazu MATSUMOTO, Synthesis of Organic Lamellar Compounds by solvent-free process, Material Stage, vol. 1, No. 11, February 2002, Technical. Information Institute Co., Ltd. pp. 48-52).

All of the conventional organic/inorganic composite materials mentioned in References 1 to 4 are, however, prepared by using amorphous or partial crystalline organic polymers as their organic polymer or their organic compound with relatively high molecular weight. Amorphous or partial crystalline organic polymers are inferior to crystalline organic polymers in terms of thermostability, flame retardance, elastic constant, tensile strength, flexural strength, impact resistance, mar resistance, linear expansion coefficient, dimensional stability, shaping processability, electric properties, dielectric breakdown strength, dielectric constant, properties under high temperature, weatherability, resistance against hydrolysis, and the like property. Therefore the conventional organic/inorganic composite materials including the amorphous or partial crystalline organic polymer are inferior and need be improved in these properties.

In addition, because organic polymers and inorganic substances are poorly compatible with each other in general, it is difficult to attain homogeneous dispersion throughout in a material. Thus, in most cases, especially the physical method, the fine metal particles with the size from about several nanometers to several ten nanometers have been difficult to be dispersed in forming the conventional complex of fine metal particles and an organic polymer, and thus properties of the fine metal particle cannot be utilized effectively.

Furthermore, in all of the conventional organic/inorganic composite materials having a lamellar structure prepared by intercalation, inorganic substances are used as host compounds and organic substances are intercalated as guest molecules. An organic/inorganic composite material prepared by intercalating an inorganic substance intercalated as guest molecules in an organic polymer having a lamellar structure has not been known.

The intercalation into the lamellar crystalline organic polymer, which intercalation reported by the inventors of the present invention in the Reference 5, is to intercalate organic compounds as guest molecules. Intercalation of metal ion into a lamellar crystalline structure of an organic polymer is not known.

DISCLOSURE INVENTION

An object of the present invention, which is accomplished in view of the problems mentioned above, it to provide a novel polymer with dispersed fine metal particles, a method, for producing the same, a novel metal ion-containing polymer suitably used in the production as an intermediate product, and a method for producing the same, wherein nano-sized fine metal particles are dispersed in the organic polymer, so that various improved characteristics are achieved, compared with the characteristics of the conventional organic/inorganic composite materials containing the amorphous or partial crystalline organic polymers.

The present invention is based on finding that alkali metal ions, which are metal ions, and the like can be introduced between layers of a lamellar crystalline organic polymer through intercalation reaction, that the alkali metal ions can be ion-exchanged with noble metal ions such as silver ion and the like, and that fine metal particles are produced through reduction thereof.

In the present invention a metal ion is introduced as a guest substance into a lamellar crystalline organic polymer by way of intercalation reaction, subsequently metal ion exchange reaction is conducted if necessary, and then the metal ion is reduced, thereby obtaining fine metal particles in the crystalline organic polymer so as to provide a novel inorganic/organic composite material with dispersed nano-sized (from about several nanometers to over ten nanometers) fine metal particles in the crystalline organic polymer.

In order to achieve the above-mentioned objects, the polymer with dispersed fine metal particles of the present invention is a polymer with dispersed fine metal particles in which fine metal particles are dispersed in an organic polymer and which is obtained by intercalation of a metal ion between layers of a lamellar crystalline organic polymer having an acidic group, and subsequent reduction.

The polymer of the above-mentioned arrangement utilizes the property of intercalation in which the reaction proceeds while retaining the molecular-level lamellar structure of a solid body. Due to the property, the metal ion is introduced in the lamellar structure of the crystalline organic polymer, while the crystalline organic polymer retaining its lamellar structure, and then the metal ion is reduced so as to produce nano-sized fine metal particles dispersed homogeneously in the lamellar structure of the crystalline organic polymer. Therefore the polymer with dispersed fine metal particles of the above-mentioned arrangement is regarded to be highly antibacterial and highly catalytic. In addition, the polymer with dispersed fine metal particles of the above-mentioned arrangement is regarded to be suitable for an optical or electronic material because the fine metal particles in the polymer with dispersed fine metal particles of the above-mentioned arrangement have a size of several nanometers and shows characteristic absorption properties in visible areas depending on the size of the fine metal particles.

Furthermore, as the material of the above-mentioned arrangement is a novel organic/inorganic composite material in forming the complex of fine metal particles with a lamellar crystalline organic polymer, it is advantageous in terms of thermostability, flame retardance, elastic constant, tensile strength, flexural strength, impact resistance, mar resistance, linear expansion coefficient, dimensional stability, shaping processability, electric properties, dielectric breakdown strength, dielectric constant, properties under high temperature, weatherability, resistance against hydrolysis and the like, compared with the conventional organic/inorganic composite materials containing amorphous or partial crystalline organic polymers.

Accordingly, the above-mentioned arrangement enables the production of a novel polymer with dispersed fine metal particles in which nano-sized fine metal particles are dispersed in an organic polymer, and which improves various properties, compared with the conventional organic/inorganic composite materials containing amorphous or partial crystalline organic polymers.

In order to solve the object of the present invention, the method for producing the polymer with dispersed fine metal particles of the invention is provided to produce a polymer with dispersed fine metal particles in which fine metal particles are dispersed in an organic polymer. The method comprises step of preparing a metal ion-containing polymer having a structure in which the metal ion is intercalated between the layers of a lamellar crystalline organic polymer having acidic groups, by mixing, with a substance containing a metal ion, lamellar crystalline organic polymer containing acidic groups and/or ammonium salt thereof; and step of reducing the metal ion in the metal ion-containing polymer to produce fine metal particles.

In the above-mentioned method, the metal ion can be introduced in the lamellar structure of the crystalline organic polymer through intercalation. Then by the photoreduction of the metal ion, nano-sized fine metal particles are produced in the crystalline organic polymer so as to produce the polymer with dispersed fine metal particles. Accordingly, it is possible to produce a polymer with dispersed fine metal particles in which fine metal particles are dispersed homogeneously in the lamellar structure of the crystalline organic polymer. In addition, by the above-mentioned method, the metal ion-containing polymer with the metal ion dispersed homogeneously can be prepared merely by mixing a lamellar crystalline organic polymer with a metal ion-containing material.

Consequently, by the above-mentioned method, a simple operation enables production of a novel polymer, with dispersed fine metal particles in which nano-sized fine metal particles are dispersed in an organic polymer, and which has various advantageous properties compared with the conventional organic/inorganic composite materials containing amorphous or partial crystalline organic polymers.

In order to solve the object of the present invention, the metal ion-containing polymer of the present invention comprises a structure where metal ion is intercalated between the layers of a lamellar crystalline organic polymer containing acidic groups.

A novel metal ion-containing polymer can be provided as an intermediate product used in the production of the polymer with dispersed fine metal particles. The metal ion-containing polymer itself is useful as an antibacterial agent, antifungal agent, oxidation catalyst, reaction catalyst (such as an isomerization catalyst, hydrogenation catalyst, hydroformylation catalyst, hydrosilylation catalyst and the like catalyst), optical material, electronic material and the like.

Since the metal ion-containing polymer is also a novel organic/inorganic composite material in forming the complex of metal ion with a lamellar crystalline organic polymer like the polymer with dispersed fine metal particles, it is advantageous, compared with organic/inorganic composite materials with amorphous or partial crystalline organic polymers, in terms of thermostability, flame retardance, elastic constant, tensile strength, flexural strength, impact resistance, mar resistance, linear expansion coefficient, dimensional stability, shaping processability, electric properties, dielectric breakdown strength, dielectric constant, properties under high temperature, weatherability, resistance against hydrolysis and the like.

Consequently, the above-mentioned arrangement can provide a novel metal ion-containing polymer, which is suitable as an intermediate product used in the production of a polymer with dispersed fine metal particles, and which is advantageously available in various applications.

In order to achieve the object of the invention, the method for producing metal ion-containing polymer of the present invention comprises the step of mixing, with a substance containing a metal ion, a lamellar crystalline organic polymer containing acidic groups or ammonium salt thereof.

By the above-mentioned method, a metal ion-containing polymer homogeneously dispersed with metal ion can be produced merely by mixing the lamellar crystalline organic polymer with a metal ion-containing substance. Thus, only with a simple operation, the method mentioned above enables production of a novel metal ion-containing polymer suitable as an intermediate product used in the production of the above-mentioned polymer with dispersed fine metal particles, and also advantageously available for a variety of applications.

Other purposes, characteristics and advantages of the present invention will become more fully understood from the following detailed description and the benefit of the present invention will become apparent from the following detailed description and the accompanying drawings.

BRIEF DESCRIPTION OF DRAWINGS

FIG. 5a illustrates a result for polymuconic acid, FIG. 5b illustrates a result for lithium polymuconate, FIG. 5c illustrates a result for sodium polymuconate and FIG. 5d illustrates a result for potassium polymuconate.

FIG. 8a illustrates a measurement result for sodium polymuconate, and FIG. 8b illustrates a measurement result for silver polymuconate obtained through the silver ion exchange reaction.

BEST MODE FOR CARRYING OUT THE INVENTION

Figure 1:
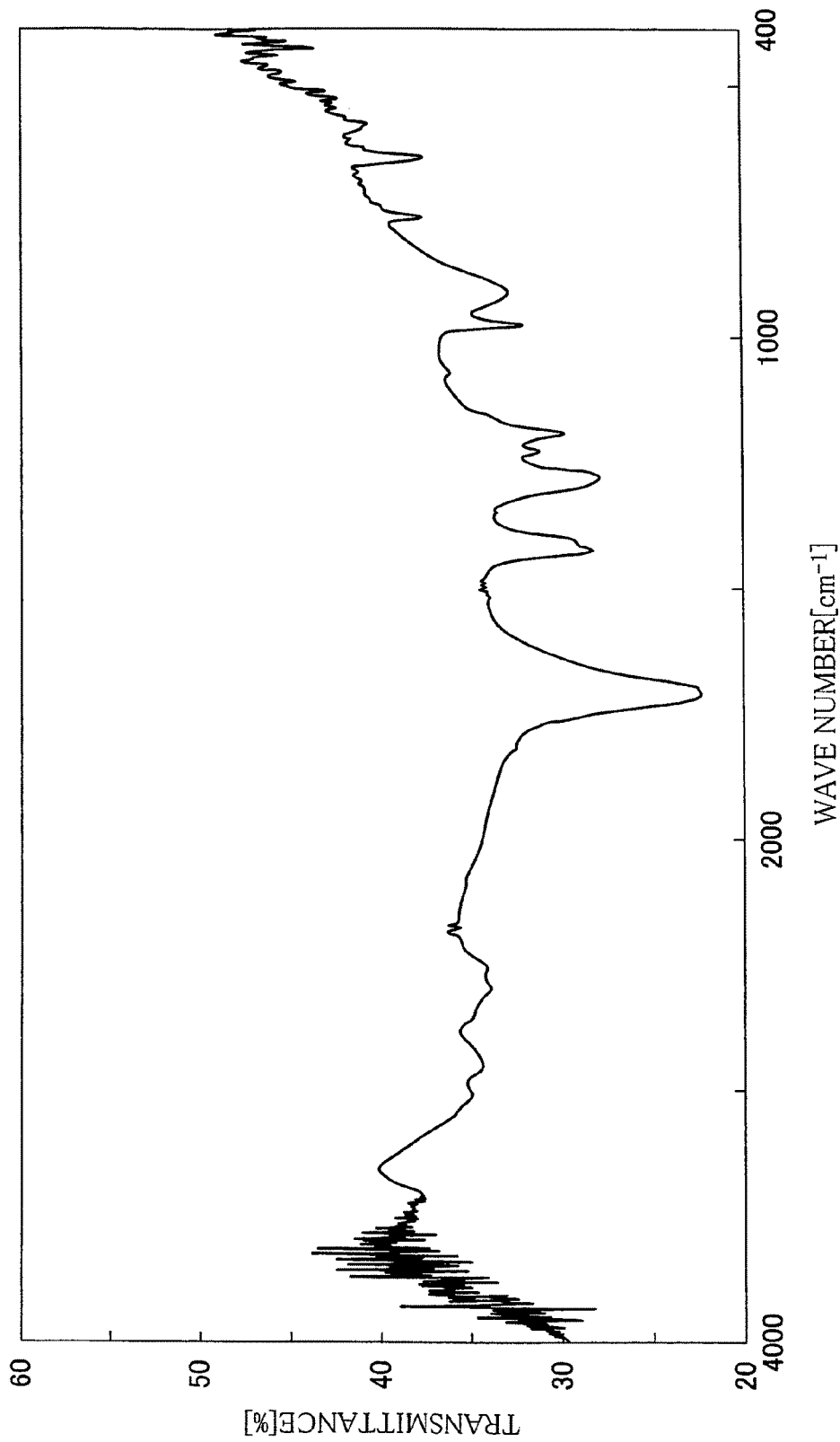
FIG. 1 is a graph illustrating an IR spectrum of polymuconic acid.

In the following an example of the present invention is described. The following description is in no way intended to limit the invention.

A "crystalline organic polymer" as used herein indicates an organic polymer consisting of almost exclusively crystallized parts with no or little non-crystalline parts (amorphous parts), even though in general an organic polymer with some crystallized parts is called as a crystalline organic polymer regardless of the ratio of the crystallized parts within the polymer. Types of organic polymers made up of almost exclusively crystalline parts are not many, and are obtained typically by topochemical polymerization. A "partial crystalline organic polymer", on the other hand, corresponds to many organic polymers with some crystalline parts, which are conventionally called as crystalline polymers. They include non-crystallized parts, i.e., amorphous parts because the entire organic polymer cannot be crystallized completely and non-crystallized parts or amorphous parts remain when it is solidified (crystallized) by evaporating or cooling a solution of the organic polymer or the organic polymer melted. The crystalline organic polymer and the partial crystalline organic polymer can be distinguished from each other clearly by powder X-ray diffraction measurement. A powder X-ray diffraction profile of the partial crystalline organic polymer has sharp peaks for the crystalline parts and broad peaks for the amorphous parts. A profile for the crystalline organic polymer used in the present invention, on the other hand, has only sharp peaks for the crystalline parts and no broad peak for the amorphous parts. A "lamellar crystalline organic polymer" used herein indicates a crystalline organic polymer with a lamellar crystalline structure.

A polymer with dispersed fine metal particles of the present invention is a polymer in which fine metal particles are dispersed in an organic polymer. The polymer with dispersed fine metal particles is obtained by intercalating a metal ion between the layers of the lamellar crystalline organic polymer having an acidic group, and subsequently performing reduction.

The aforementioned lamellar crystalline organic polymer containing an acidic group is preferably a lamellar crystalline organic polymer comprising a carboxyl group, more preferably a diene polymer comprising a carboxyl group, most preferably polymuconic acid crystal and crystallized polysorbic acid crystal.

The fine metal particles are preferably at least one kind of transition metals such as silver, gold, platinum group (ruthenium, rhodium, palladium, osmium, iridium and platinum), nickel, copper, zinc and the like metals, and particularly preferably fine metal particles of at least one kind of noble metals such as silver, gold and platinum group (ruthenium, rhodium, palladium, osmium, iridium and platinum). With this arrangement, the polymer with dispersed fine metal particles suitable as an antibacterial agent, antifungal agent, oxidation catalyst, reaction catalyst (such as isomeric catalyst, hydrogenation catalyst, hydroformylation catalyst, hydrosilylation catalyst and the other catalysts) can be provided. Because noble metal nanoparticles are known to show different electric and optical properties from noble metals in the bulk state, the noble metal nanoparticles are expected to have unique functions. Therefore, it is expected that the noble metal nanoparticles are also applicable as optical and electronic materials. The metal ions corresponding to the fine metal particles may be used.

The polymer with dispersed fine metal particles according to the present invention is produced by a method comprising: preparing a metal ion-containing polymer having a structure in which the metal ion is intercalated between layers of a lamellar crystalline organic polymer having an acidic group; and reducing the metal ion in the metal ion-containing polymer so as to produce fine metal particles.

The lamellar crystalline organic polymer containing the acidic group is preferably a lamellar crystalline organic polymer comprising a carboxyl group, and more preferably a polymer of a diene comprising a carboxyl group. However polymuconic acid crystal and polysorbic acid crystal are most preferable as the lamellar crystalline organic polymer containing an acidic group.

In the following a method of producing a metal ion-containing polymer is described.

With respect to the method for producing the metal ion-containing crystalline organic polymer of the present invention, it is preferable to mix, with a metal ion-containing substance, a lamellar crystalline organic polymer containing an acidic group and/or an ammonium salt thereof.

The metal ion-containing substance is not particularly limited but preferably a metal hydroxide, because a metal ion is introduced efficiently between the layers of the crystalline organic polymer.

In mixing the metal ion-containing substance with the crystalline organic polymer, the crystalline organic polymer is preferably impregnated with or dispersed in a solvent, and more preferably the crystalline organic polymer is impregnated or dispersed in the solution of a metal ion-containing substance. With this arrangement the metal ions can be efficiently introduced between the layers of the crystalline organic polymer. Any solvents can be employed as far as the metal ion can be separated from a counter ion and as far as the crystalline organic polymer is not soluble therein. Examples of the solvents are organic solvents such as alcohols such as methanol, isopropanol and the like, and ketones such as acetone, methylethylketone and the like; ethers such as t-butylmethylether and the like; halogen solvents such as 1,2-dichloroethane and the like; aromatic hydrocarbons such as toluene and the like; and aliphatic hydrocarbons such as hexane and the like; and the other organic solvents. Among them, alcohol is preferable, and methanol is particularly preferable. The solution of a substance containing the metal ion preferably has a concentration of 0.25 mol/L or more, and particularly preferably 1 mol/L or more, in order to attain a highly efficient introduction of the metal ion.

If a metal ion (particularly a noble metal ion) other than alkali metal ions is to be introduced, it is preferable that the metal ion-containing polymer (an alkali metal ion-containing polymer) in which the alkali metal ion is intercalated between the layers of the lamellar crystalline organic polymer having the acidic group is prepared by mixing a lamellar crystalline organic polymer containing an ammonium carboxylate group or a lamellar crystalline organic polymer containing a carboxylic group with a substance containing substance containing the alkali metal ion, and subsequently the alkali metal ion in the metal ion-containing polymer is ion-exchanged with the metal ion other than alkali metal ions. By the metal ion exchange reaction, the metal ion is more efficiently introduced between the layers of the crystalline organic polymer, compared with the direct introduction of the metal ion.

As for the ion exchange reaction, a metal ion-containing polymer intercalated with an alkali metal ion may be impregnated with a solution in which a material containing a metal ion other than alkali metal ions is dissolved in a solvent such as for example water, an alcohol, and the like. The substance containing the metal ion other than alkali metal ions is preferably a solution of silver nitrate if the metal ion is silver ion. The solution of silver nitrate preferably has a concentration of 0.25 mol/L or more, and particularly preferably of 1 mol/L or more.

As the above-mentioned lamellar crystalline organic polymer containing the acidic group and/or ammonium salt thereof, a lamellar crystalline organic polymer containing sulfonic acid group and/or ammonium salt thereof, carboxylic acid group and/or ammonium salt thereof and the like may be used. Particularly preferable is the lamellar crystalline organic polymer containing ammonium carboxylate group with general formula —COO—$Z^+$, where $Z^+$ is $NH_4^+$, or a primary, secondary, tertiary or quaternary ammonium ion) or the lamellar crystalline organic polymer containing a carboxylic group.

In the following, a lamellar crystalline organic polymer containing ammonium carboxylate group used in the above-mentioned production method is described.

A crystalline organic polymer containing ammonium carboxylate group may be any crystalline organic polymer having a lamellar structure and ammonium carboxylate group. Preferable examples of a crystalline organic polymer are a polymer of a conjugated diene containing ammonium carboxylate group, such as, for example, ammonium polymuconate, ammonium polysorbate, polybutadiene ammonium carboxylate, and more preferably ammonium polymuconate and ammonium polysorbate.

The crystalline organic polymer containing ammonium carboxylate group is obtained by polymerizing, in its crystalline state, a crystalline monomer having ammonium carboxylate group.

The crystalline monomer having ammonium carboxylate group may be any crystalline monomers containing at least one unsaturated bond, which allows additional polymerization, and preferably the crystalline monomer containing a conjugated diene portion. Thus, the above-mentioned monomer is preferably a conjugated diene containing carboxylic group. The conjugated diene is typically expressed by the following general formula:

Y—CH=CH—CH=CH—COO—$Z^+$,

Where Y is one of carboxylic group, groups derived from carboxylic groups (such as ester groups, amid groups, ammonium carboxylate and the like), hydrocarbon groups with or without a functional group, and hydrogen. The examples of $Z^+$ have been mentioned above. In the conjugated diene expressed by the aforementioned general formula, part of the hydrogen atoms directly bonded with a carbon atom in the portion of the conjugated diene may be substituted for a hydrocarbon group.

The above-mentioned monomer containing ammonium carboxylate group can be obtained by mixing the conjugated diene containing a carboxylic group with an amine in a liquid medium such as a solvent or in the absence of a liquid medium in order to ion-bond carboxylate ion and ammonium ion. The mixing in the absence of a liquid medium is preferable because it does not require separation of the liquid medium or the recrystallization so that the production of a monomer containing ammonium carboxylate group is easier. In addition, during the mixing in the absence of a liquid medium, it is preferable that crystals be ground in a mortar so as to raise the reaction rate.

Examples of the conjugated diene containing the carboxylic group are $\alpha,\beta$-unsaturated dibasic carboxylic acid such as muconic acid (e.g. (Z,Z)-muconic acid, (E,E)-muconic acid and (E,Z)-muconic acid) and the like acid; $\alpha,\beta$-unsaturated monobasic carboxylic acid, such as sorbic acid, butadiene carboxylic acid and butadiene carboxylic acid with alkyl substituent; and the like.

The amine is not particularly limited and may be primary amines, such as methylamine, ethylamine, n-propylamine, n-butylamine, isobutyl amine, sec-butyl amine, tert-butyl amine, octyl amine, cyclohexyl amine, ethanol amine, benzyl amine, dodecyl amine, 1-naphthymethylamine and the like; secondary amines; ammonium; and the like. Among them the primary amines are preferable because they easily constitute a column structure. As the amines are preferably amines having a molecular structure that enables easy formation of a column structure (the molecular structure may be, e.g., a group with a benzene ring, a group with a naphthalene ring, group with a long chain alkyl, and the like). Specifically, long chain alkyl amines having 7 or more (preferably 9 or more) carbon number, and amines with an aryl group are preferable. More preferable is at least one compound selected from the group consisting of benzyl amine, dodecyl amine and 1-naphthalene methylamine, and particularly preferable is 1-naphthalene methylamine.

The lamellar crystalline organic polymer containing ammonium carboxylate group is obtained by polymerizing, in its crystalline state, the crystalline monomer containing ammonium carboxylate group. The monomer molecules are polymerized though topochemical polymerization with minimum molecular movement under the control of the crystalline lattice of the lamellar crystals. By the topochemical polymerization, a crystalline organic polymer having a lamellar crystalline structure generally having 10 to 10,000,000 recurring units, and typically from 100 to 100,000 recurring units are produced.

As for the method of polymerization, the polymerization in the absence of a liquid medium is preferable because it does not require separation of the liquid medium or recrystallization so that the production of a lamellar crystalline organic polymer containing ammonium carboxylate group is easy. In addition, during the mixing in the absence of a liquid medium, crystals are preferably ground in the mortar so as to raise the reaction rate.

As for a method of polymerization of the crystalline monomer containing the carboxylic group, radiation-induced polymerization or solid state photopolymerization may be used in which visible light (sunlight), ultraviolet rays, X-ray, or radioactive rays such as $\gamma$-ray is radiated onto the crystalline monomer containing the carboxylic group. Thermal polymerization may be also used in which the polymerization is induced by heat.

Compared with the thermal polymerization, the radiation-induced polymerization utilizing X-ray and $\gamma$-ray with high transmittancy enables starting reaction homogenously in the entire crystal, so that resultant polymer crystal has remarkably less distortion and defects. Therefore the radiation-induced polymerization, especially that using X-ray and $\gamma$-ray is more advantageous in terms of purity of the resultant crystal. The thermal polymerization, on the other hand, only requires a much simpler apparatus compared with that for the radiation-induced polymerization using ultraviolet ray, X-ray, $\gamma$-ray and the like. It is also safer compared with the radiation-induced polymerization using X-ray, $\gamma$-ray and the like which involves risk of radiation exposure. Also the thermal polymerization enables producing crystalline organic polymer easily merely by controlling the temperature. In the thermal polymerization, if the monomers are polymerized under a constant temperature, the crystalline monomer could remain under a constant temperature, thus enabling the entire crystal to be polymerized homogeneously, so that a homogeneous and thus high-quality crystalline organic polymer without much distortion is produced. The thermal polymerization and the radiation-induced polymerization may be combined so as to raise the polymerization rate remarkably.

In case of the thermal polymerization, the polymerization temperature may be any temperature where the obtained monomers start polymerization, but is preferably below a melting point or a decomposition point of the monomer, that is, below a temperature where the crystalline structures of the monomers are not changed. Under such temperature, monomers can be polymerized by the thermal polymerization while retaining the crystalline state of the monomers. The temperature below the melting point of the monomer is preferably lower than a temperature where the monomer starts to be melted. The temperature below a decomposition point of (Z,Z)-ammonium muconate is preferably lower than the temperature in which the monomer starts to be decomposed. Furthermore, in case the polymerization temperature is higher than the temperature in which the monomer starts to be decomposed, the polymerization temperature is preferably such temperature at which the monomer is polymerized at a high rate and which the polymerization rate and the decomposition rate differ greatly.

In the following, the crystalline organic polymer containing the carboxylic group is described.

The crystalline organic polymer containing the carboxylic group may be, without limitation, any crystalline organic polymer with a lamellar structure containing the carboxylic group. Preferable examples of the crystalline organic polymer containing the carboxylic group are a polymer of the conjugated diene containing a carboxylic group, such as polymuconic acid, polysorbic acid, polybutadiene carboxylic acid, and more preferable examples are polymuconic acid and polysorbic acid.

The crystalline organic polymer containing the carboxylic group is prepared by polymerizing, in its crystalline state, a crystalline monomer containing at least one decomposable group derived from carboxylic group and by subsequent hydrolyzing the polymer.

The decomposable group of the monomer, which is derived from carboxylic group, is a substituent that is derived from carboxylic group and that can be converted to a carboxylic group through hydrolysis or thermolysis. Examples of the decomposable group derived from carboxylic group include, ester group (general formula: —COOR, where R is a substituent expressed by hydrocarbon group) which can be obtained through reaction of a carboxylic group and an alcohol; ammonium carboxylate group obtained through reaction of a carboxylic group and an amine or ammonium; and the like. Therefore the monomer containing the decomposable group derived from carboxylic group is, in other words, decomposable group derived from carboxylic acid, the decomposable group derived from carboxylic acid containing at least one unsaturated bond that allows addition polymerization. For example, the derivative may be an ester containing at least one unsaturated bond, that allows addition polymerization, an ammonium carboxylate containing at least one unsaturated bond, that allows addition polymerization, and the like compound. The monomer containing the decomposable group derived from carboxylic group may contain more than two different groups derived from carboxylic group in one molecule.

The monomer containing the decomposable group derived from carboxylic group may contain at least one unsaturated bond that allows addition polymerization, but preferably has a conjugated diene portion. Therefore the monomer is preferably a conjugated diene containing the decomposable group derived from carboxylic group. The conjugated diene is typically expressed as the following general formula:

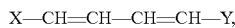

X—CH=CH—CH=CH—Y, where X and Y are independent each other, X is selected from decomposable groups derived from carboxylic group, such as ester group, ammonium carboxylate group and the like group, and Y is selected from carboxylic groups, groups derived from carboxylic group, such as ester groups, amid groups, ammonium carboxylate groups and the like groups), hydrocarbon groups with or without a functional group, and hydrogen. The groups derived from carboxylic group such as ester group, ammonium salt and the like can be expressed, for example, as $COOR^1$, $COONH_4$, $COONH_3R^2$ and the like, where $R^1$ and $R^2$ are independently hydrocarbon groups with or without a functional group. Preferably $R^1$ and $R^2$ contain groups with a molecular structure that enables easy formation of a column structure in the crystalline state, such as a group having a benzene ring, a group having a naphthalene ring, a group having a long chain alkyl (particularly preferably having 8 or more carbon numbers). In the conjugated diene expressed by the general formula above, part of the hydrogen atoms directly bonded to the carbon atoms of the conjugated diene may be substituted for a hydrocarbon group.

In case X is an ester group, the monomer containing decomposable group derived from carboxylic group can be obtained by mixing, with alcohol, a conjugated diene containing a carboxylic group, such as muconic acid, sorbic acid, butadiene carboxylic acid, butadiene carboxylic acid with alkyl substituent, and the like compound, and by subsequently condensing the conjugated diene and the alcohol in a conventional known manner. In that case the condensation is preferably conducted without heating. A condensing agent or the like may be used, for example.

Preferred examples of the alcohol include, without limitation, primary alcohols such as methanol, ethanol, chloroethanol, bromoethanol, methoxyethanol, ethoxyethanol, n-propanol, n-butanol, isobutanol, benzyl alcohol, chlorobenzyl alcohol, bromobenzyl alcohol, methylbenzyl alcohol, ethylbenzyl alcohol, methoxybenzyl alcohol, ethoxybenzyl alcohol, phenoxybenzyl alcohol, naphthylmethyl alcohol, dodecyl alcohol, tetradecyl alcohol, hexadecyl alcohol, octadecyl alcohol, and other primary alcohols; secondary alcohols; tertiary alcohols; and the other alcohols. The primary alcohols are preferred. Among them primary alcohols having a molecular structure that allows easy formation of a column structure in the crystalline state are preferable. Specifically, the preferred primary alcohols are primary alcohols having at least one of the compounds selected from the group consisting of benzyl alcohol, chlorobenzyl alcohol, bromobenzyl alcohol, methylbenzyl alcohol, ethylbenzyl alcohol, methoxybenzyl alcohol, ethoxybenzyl alcohol and phenoxybenzyl alcohol. Particularly, chlorobenzyl alcohol, bromobenzyl alcohol, and methoxybenzyl alcohol are preferable.

The monomer containing the decomposable group derived from carboxylic group can be produced by the method mentioned above if X is ammonium carboxylate group, i.e., a monomer containing ammonium carboxylate group.

The crystalline organic polymer containing the decomposable group derived from carboxylic group can be obtained by polymerizing, in its crystalline state, the above-mentioned crystalline monomer containing at least one decomposable group derived from carboxylic group. The polymerization method may employ the above-mentioned radiation-induced polymerization and/or thermal polymerization.

Next, decomposition of the lamellar crystalline organic polymer thus obtained through the above-mentioned polymerization is carried out, the lamellar crystalline organic polymer containing a group derived from carboxylic group. As a result of the decomposition, the lamellar crystalline organic polymer is converted into the lamellar crystalline organic polymer containing carboxylic group. Then, amine or alcohol detached from the crystalline organic polymer are removed so as to isolate the lamellar crystalline organic polymer containing the carboxylic group. As for the decomposition method, any method may be employed as far as the method allows keeping the lamellar crystalline structure. For instance, a method of thermolysis in which the crystals are decomposed by heating, a method of solid-state hydrolysis in which the lamellar crystalline organic polymer containing a group derived from carboxylic group is hydrolyzed using an acid such as hydrochloric acid or the like acid. Among those methods, the thermal decomposition is preferred because it does not use a liquid medium. An example of the method of hydrolysis with acids is to impregnate the crystals of 2,5-ammonium polymuconate with methanol solution of hydrochloric acid, the methanol solution containing water or with aqueous solution of hydrochloric acid.

Through the above-mentioned method, the metal ion-containing crystalline organic polymer is thus obtained from the lamellar crystalline organic polymer containing ammonium carboxylate group or from the lamellar crystalline organic polymer containing a carboxylic group.

In the method of producing the polymer with dispersed fine metal particles of the invention, as the subsequent step of the method, the obtained metal ion-containing crystalline organic polymer is subjected to reduction so as to reduce the metal ion in the metal ion-containing polymer, thereby producing fine metal particles.

The reduction reaction of the metal ion may be carried out, for example, by a method using alcohol as a reducing agent; a method using hydrogen gas as a reducing agent; a method using a chemical reducing agent such as $NaBH_4$, hydrazine, alkylborane or the like; decomposition reduction using energy of various types (e.g. photoreduction using visible light, ultraviolet rays or the like, γ-ray irradiation, and thermolysis; electrochemical method; method using ultrasonic wave; and the like), and the like methods. In order to assure to retain the lamellar crystalline structure of the photonic crystalline organic polymers, it is preferable to reduce metal ions under gentle conditions. Specifically, in case the metal ion is a silver ion or a gold ion, the reduction is preferably conducted through photoreduction by using visible light or ultraviolet rays. In case the metal ion is a cation of platinum group, such as platinum, palladium, rhodium, iridium and the like, reduction is preferably conducted under gentle conditions such as using alcohol as a reducing agent.

The polymer with dispersed fine metal particles of the invention is attained in the manner described above. The polymer with dispersed fine metal particles of the invention is expected to be applicable to a variety of fields; e.g. as polymeric materials, organic synthesis, catalysts, electric and electronic materials. The polymer with dispersed fine metal particles containing silver particles as metal particles is available as an antibacterial agent, antifungal agent, oxidation catalyst, optical material, electronic material and the like. The polymer with dispersed fine metal particles containing fine metal particles other than silver fine particles, such as fine particles of gold, platinum group (ruthenium, rhodium, palladium, osmium, iridium and platinum), nickel, copper, zinc and the like, are advantageously available as an antibacterial agent, antifungal agent, oxidation catalyst, reaction catalyst (e.g. an isomerization catalyst, hydrogenation catalyst, hydroformylation catalyst, and hydrosilylation catalyst), optical material, electronic material and the like.

In the above description, the metal ion-containing polymer of the invention is used as an intermediate product used in the production of the polymer with dispersed fine metal particles. However, the metal ion-containing polymer of the invention can be used in a variety of applications by itself. The metal ion-containing polymer containing silver ion as the metal ion can be used as an antibacterial agent, antifungal agent, oxidation catalyst and the like. The metal ion-containing polymer containing the metal ion other than silver ion, such as gold ion, platinum group ion, copper ion, zinc ion and the like ions, can be used as an antibacterial agent, antifungal agent, reaction catalyst (e.g. an isomerization catalyst, hydrogenation catalyst, hydroformylation catalyst, hydrosilylation catalyst and the like) and the like.

The present invention is explained further in detail by the following embodiments but the invention is in no way limited to the embodiments.

[Measurement Instruments and Measurement Conditions]

In the following examples, IR spectrums (Infrared absorption spectrums) were measured by using KBr tablet method using Herchel FT-IR-430 (a Fourier transform infrared spectroscopy manufactured by JASCO Corporation).

Powder X-ray diffraction measurement in the following examples was carried out by using an X-ray diffract meter, "RINT 2100", manufactured by Rigaku Corporation. The measurement was carried out under the conditions of CuKα, λ=1.5418 Å.

EPMA (Electron Probe MicroAnalyser) analysis in the following examples employed an EPMA provided with energy disperse X-ray spectrometer. The EPMA used was "JSM-5800" manufactured by JEOL ltd. An acceleration voltage was 20 kV.

SEM (Scanning Electron Microscope) images in the following example were picked up by an SEM "S-3500" manufactured by Hitachi Ltd. The SEM image was picked up with an acceleration voltage 25 kV.

TEM (transmission electron microscope) images in the following example were taken by a TEM "type JEM-2000FX" manufactured by JEOL ltd. The TEM image was taken with an acceleration voltage 200 kV.

In the following examples, ultraviolet-visible region diffuse reflection spectrum was measured by an ultraviolet-visible region spectrophotometer "V-550DS" provided with an integrating sphere, the "V-550DS" manufactured by JASCO Corporation.

[Synthesis of Benzyl Ammonium Polymuconate]

First, crystal of (Z,Z)-benzyl ammonium muconate was synthesized. The crystal was such crystal that allowed topochemical polymerization (in which material were polymerized in its crystalline state) via solid-state photopolymerization, and was of a monomer containing ammonium carboxylate. 0.9291 g ($6.54 \times 10^{-3}$ mol) crystal of (Z,Z)-muconic acid and 1.4012 g ($1.31 \times 10^{-2}$ mol) of benzyl amine, which was a liquid at room temperatures, were ground in a mortar for 30 minutes at room temperatures to cause them to react with reach other.

An IR spectrum of a product thus obtained by the reaction did not show an absorption peak of $1710\ cm^{-1}$ for carboxylic group, but an absorption peak of $1560\ cm^{-1}$ for carboxylate. In powder X-ray diffraction measurement, the product showed the same diffraction pattern as that of (Z,Z)-benzyl ammonium muconate produced by a conventional method in which reaction was carried out in a solvent and then isolation was carried out after recrystallization. From the observations above, it was found that crystals of (Z,Z)-benzyl ammonium muconate were obtained via the reaction took place quantitatively.

Subsequently, the ultraviolet ray was irradiated to the crystal of the synthesized (Z,Z)-benzyl ammonium muconate by using a high-pressure mercury arc lamp at 30° C. for 72 hours. This caused solid-state photopolymerization of (Z,Z)-benzyl ammonium muconate so as to produce a product insoluble in the solvent. After the irradiation, unreacted monomer ((Z,Z)-benzyl ammonium muconate) was extracted with methanol. As a result, needle-shaped crystal was obtained.

In an IR spectrum of the isolated product, an absorption peak of $1580\ cm^{-1}$ for a conjugated diene was not found, thus it was confirmed that (Z,Z)-benzyl ammonium muconate was polymerized and the needle-shaped crystal of 2,5-benzyl ammonium polymuconate, which was a lamellar crystalline organic polymer containing an ammonium carboxylate group, was produced. A yield of 2,5-benzyl ammonium polymuconate was 30%.

Example 1

0.2925 g of the thus obtained 2,5-benzyl ammonium polymuconate as the lamellar crystalline organic polymer containing the ammonium carboxylate group was impregnated for 30 minutes with 20 ml of methanol solution in which lithium hydroxide, as a metal ion-containing substance, was contained at a concentration of 1 mol/L.

Figure 2:
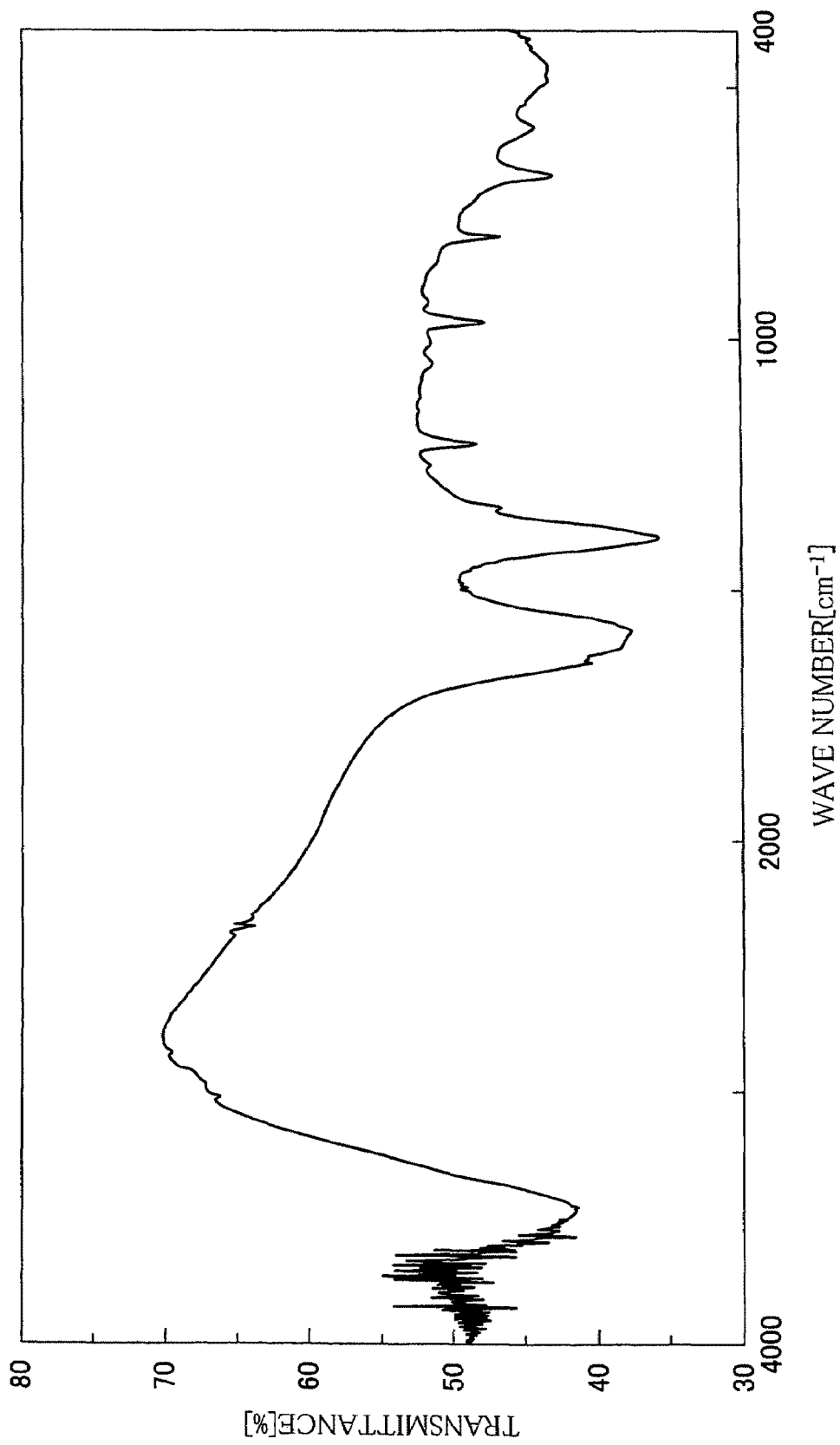
FIG. 2 is a graph illustrating an IR spectrum of lithium polymuconate.

In an IR spectrum after the reaction, many peaks derived from a phenyl group of 2,5-benzyl ammonium polymuconate were not found, as illustrated in FIG. 2, and then absorption of carboxylate was observed at $1586\ cm^{-1}$. Thus it was confirmed that 2,5-lithium polymuconate (which was a metal ion-containing polymer) was quantitatively obtained as a reaction product, 2,5-lithium polymuconate having a structure in which lithium ion was intercalated between layers of the lamellar crystal (the lamellar crystalline organic polymer) of 2,5-polymuconic acid. For a reference an IR spectrum for 2,5-polymuconic acid obtained by thermal decomposition of 2,5-benzyl ammonium polymuconate is illustrated in FIG. 1.

Figure 5:
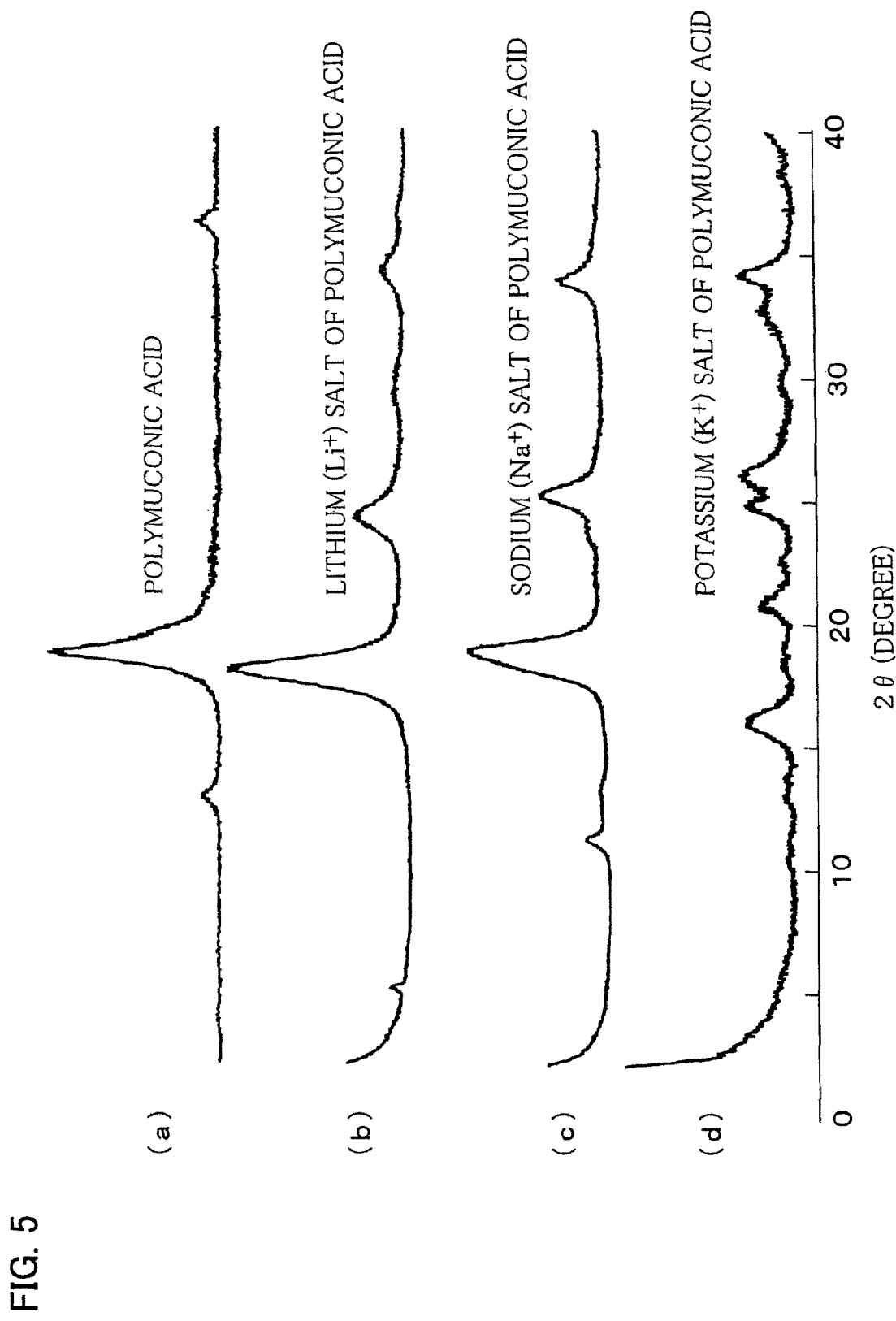
FIG. 5 are graphs illustrating results of powder X-ray diffraction measurement.

A diffraction peak was, as illustrated in FIG. 5*b*, obtained in the powder X-ray diffraction measurement. This confirmed that the product retained its crystalline state even after the reaction. A result of powder X-ray diffraction measurement for 2,5-polymuconic acid is illustrated in FIG. 5a for a reference.

Example 2

0.2881 g of 2,5-benzyl ammonium polymuconate synthesized by the above-mentioned method as in Example 1 was impregnated for 30 minutes with 20 ml of methanol solution of sodium hydroxide with a concentration of 1 mol/L. This converted 2,5-benzyl ammonium polymuconate into a sodium salt.

Figure 3:
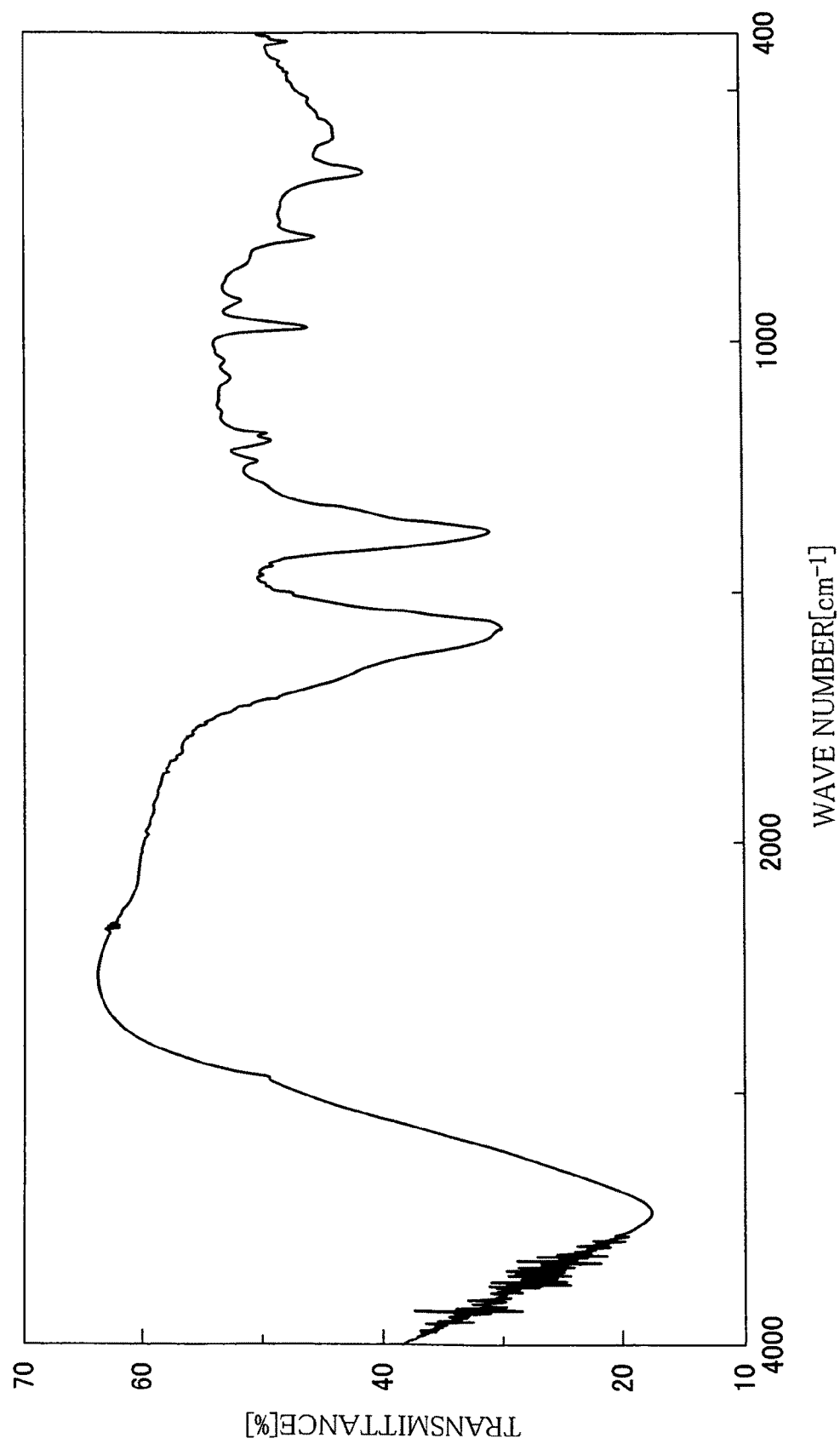
FIG. 3 is a graph illustrating an IR spectrum of sodium polymuconate.

In an IR spectrum after the reaction, many peaks derived from the phenyl group of benzyl ammonium polymuconate were not found, as illustrated in FIG. 3. Meanwhile absorption of carboxylate was observed at 1576 $cm^{-1}$. It was confirmed that 2,5-sodium polymuconate (which was a metal ion-containing polymer) was quantitatively obtained as a reaction product, 2,5-sodium polymuconate being a metal ion-containing polymer in which sodium ion was intercalated between layers of the lamellar crystals of 2,5-polymuconic acid.

A diffraction peak was, as illustrated in FIG. 5c, obtained in the powder X-ray diffraction measurement. This confirmed that the product retained the crystalline state (i.e., lamellar crystalline structure) even after the reaction.

The sodium polymuconate thus obtained as the mentioned above, was dissolved in water or an aqueous sodium hydroxide solution having a concentration of 0.1 mol/L or less, so the sodium polymuconate did not retain the crystalline structure in water and the aqueous sodium hydroxide solution. The sodium polymuconate remained, however, insoluble, in a high concentrated aqueous solution in which sodium hydroxide was contained at a concentration of 0.25 mol/L or more. Thus it was found that the sodium polymuconate can allow ion exchange retaining its lamellar structure in the high concentrated aqueous solution in which sodium hydroxide was contained at a concentration of 0.25 mol/L or more. A reason why the sodium polymuconate was soluble in the aqueous solution with low concentration is supposed that the water goes in between the layers by osmotic pressure, due to the high ion concentration between the layers of the crystalline organic polymer.

Sodium polymuconate was also obtained by carrying out the similar reaction after converting the crystals of benzyl ammonium polymuconate into the crystals of polymuconic acid by the solid-state hydrolysis or the thermal decomposition and subsequently isolating the crystals of polymuconic acid.

Example 3

0.1945 g of 2,5-benzyl ammonium polymuconate synthesized by the above-mentioned method was impregnated for 30 minutes with 20 ml of methanol solution in which potassium hydroxide was contained at a concentration of 1 mol/L, thereby converting 2,5-benzyl ammonium polymuconate into the potassium salt.

Figure 4:
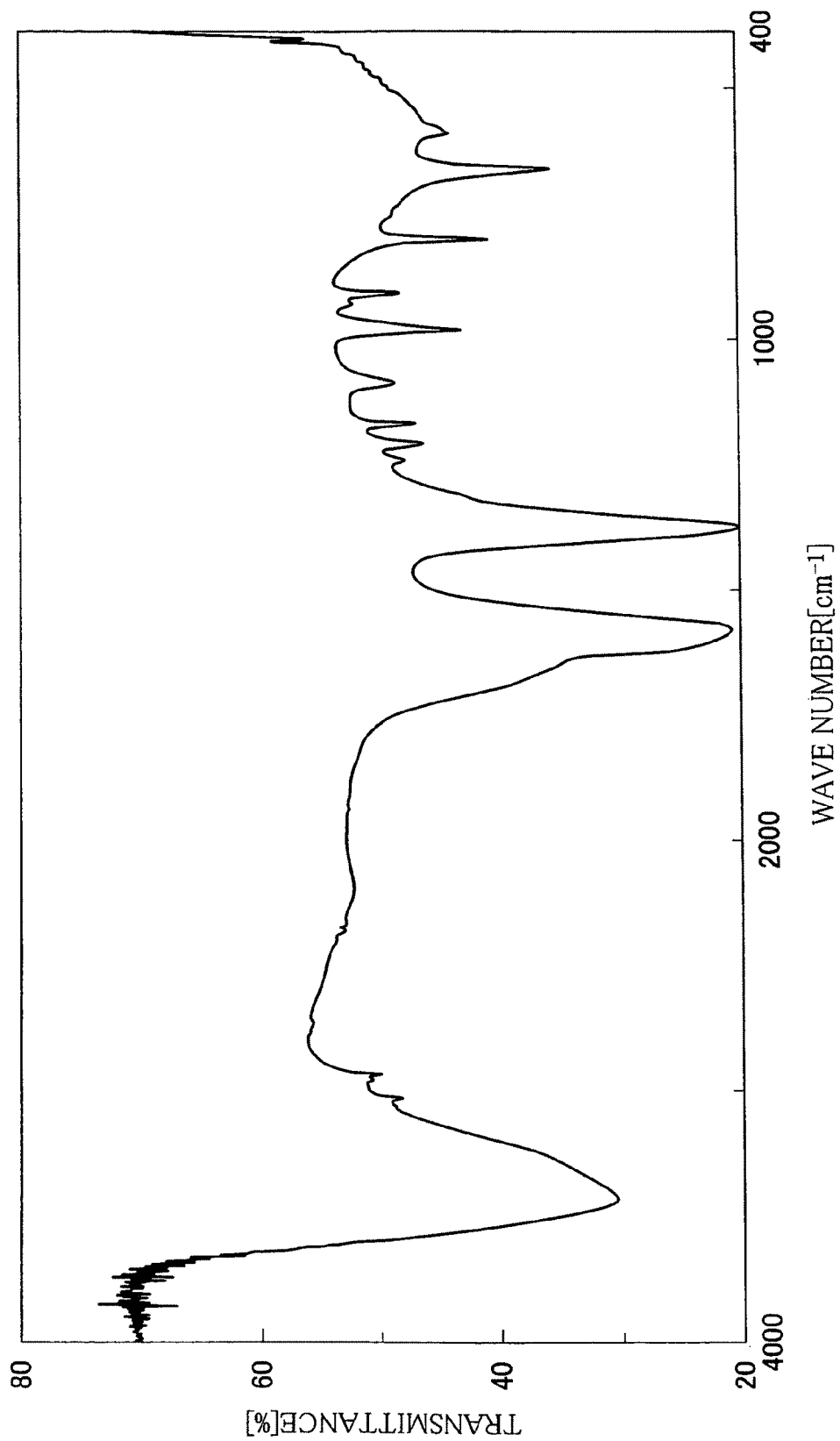
FIG. 4 is a graph illustrating an IR spectrum of potassium polymuconate.

In an IR spectrum after the reaction, many peaks derived from the phenyl group of benzyl ammonium polymuconate were not found, as illustrated in FIG. 4, and then absorption of carboxylate was observed at 1572 $cm^{-1}$. Thus it was confirmed that 2,5-potassium polymuconate was quantitatively obtained as a reaction product, 2,5-potassium polymuconate being a metal ion-containing polymer in which potassium ions were intercalated between the layers of lamellar crystals having 2,5-polymuconic acid.

A diffraction peak was, as illustrated in FIG. 5d, obtained in the powder X-ray diffraction measurement. This confirmed that the product retained the crystalline state (i.e., lamellar crystalline structure) even after the reaction.

Example 4

Figure 6:
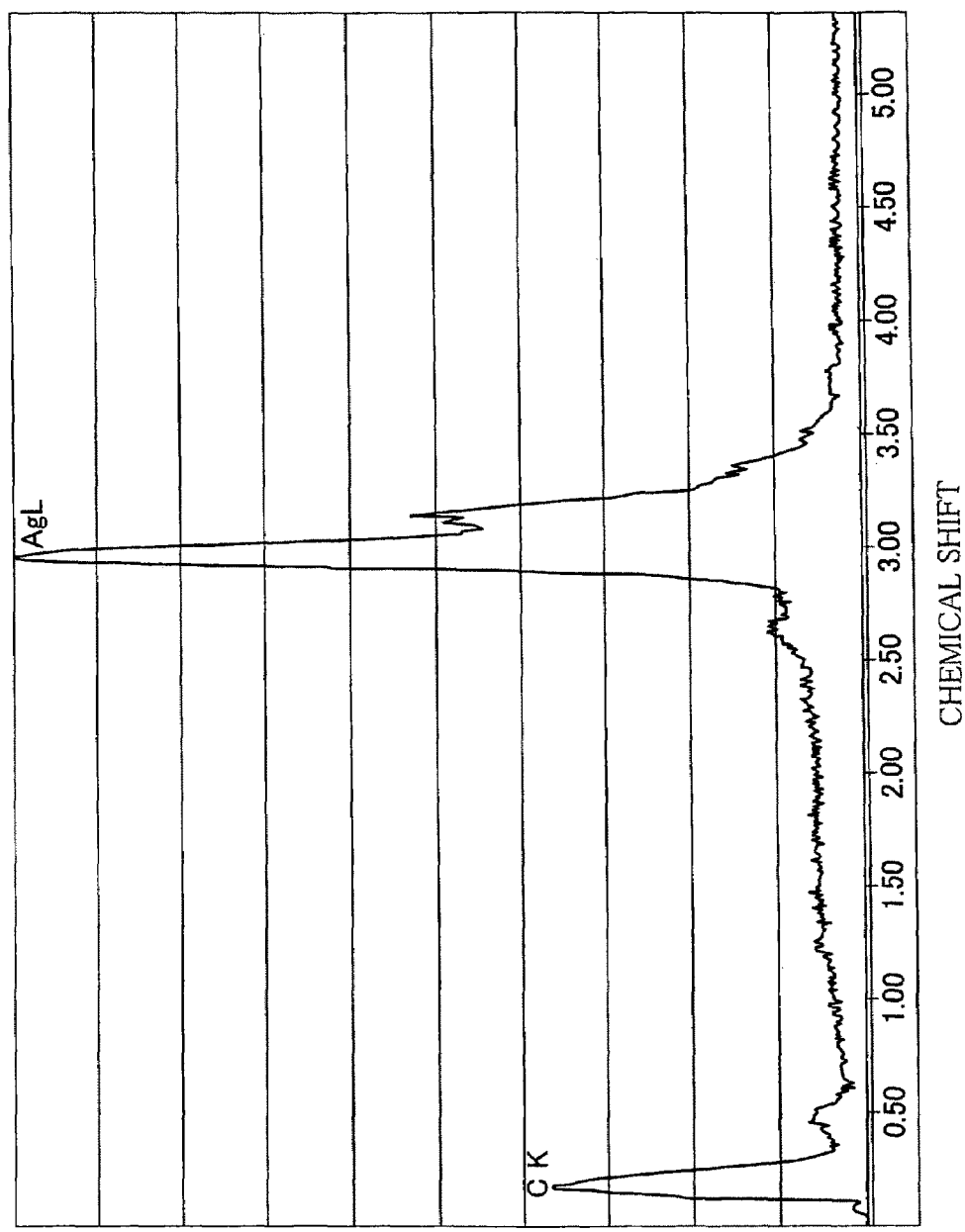
FIG. 6 is a chart illustrating a result of EPMA analysis for silver polymuconate obtained by silver ion exchange reaction using an aqueous solution of silver nitrate.

0.057 g of sodium polymuconate synthesized in the example 2 was impregnated for one hour with 10 ml of aqueous solution in which silver nitrate was contained at a concentration of 1 mol/L, thereby ion-exchanging sodium ions with silver ions. During EPMA analysis of the crystalline organic polymer after the reaction, the peak based on sodium ions was not found but the peak based on silver ions was found, as illustrated in FIG. 6. Thus, it was confirmed that the sodium ions were ion-exchanged quantitatively with silver ions while the crystalline polymer retaining its solid state, so that the crystal of 2,5-silver polymuconate was obtained, 2,5-silver polymuconate being a metal ion-containing polymer having a structure in which the silver ion was intercalated between layers of lamellar crystal of 2,5-polymuconic acid.

Figure 8:
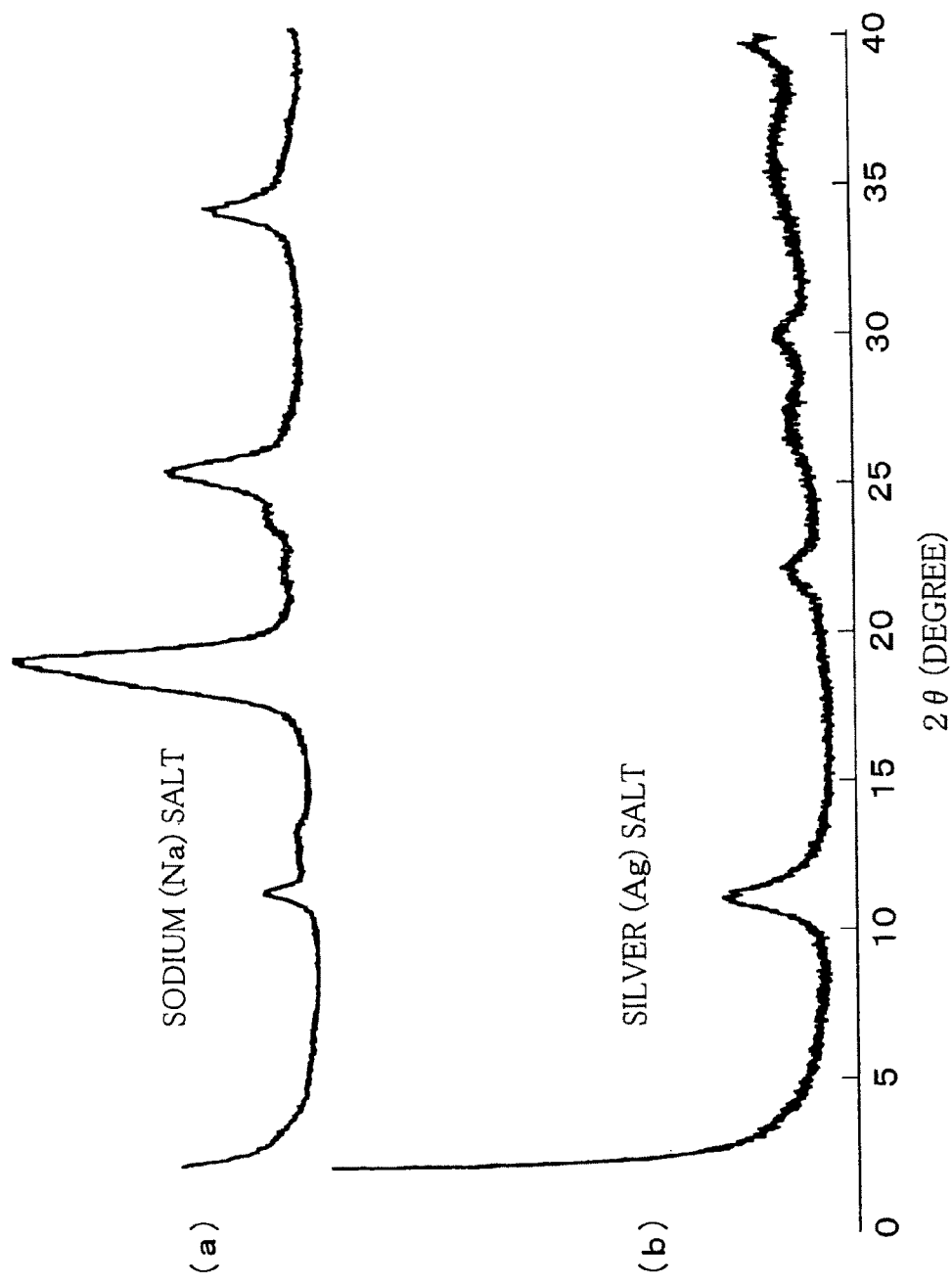
FIG. 8 are graphs illustrating a result of powder X-ray diffraction measurement before and after the silver ion exchange.

It was also confirmed that, as illustrated in FIG. 8, the diffraction pattern of the powder X-ray diffraction measurement for 2,5-silver polymuconate differed that for 2,5-sodium polymuconate.

Example 5

Ion exchange reaction similar to that in the example 4 was carried out under the same conditions except that the concentration of silver nitrate was low. In other words, methanol solution in which silver nitrate was contained at a concentration of 0.1 mol/L was used instead of 10 ml of the aqueous solution in which silver nitrate was contained at a concentration of 1 mol/L.

Figure 7:
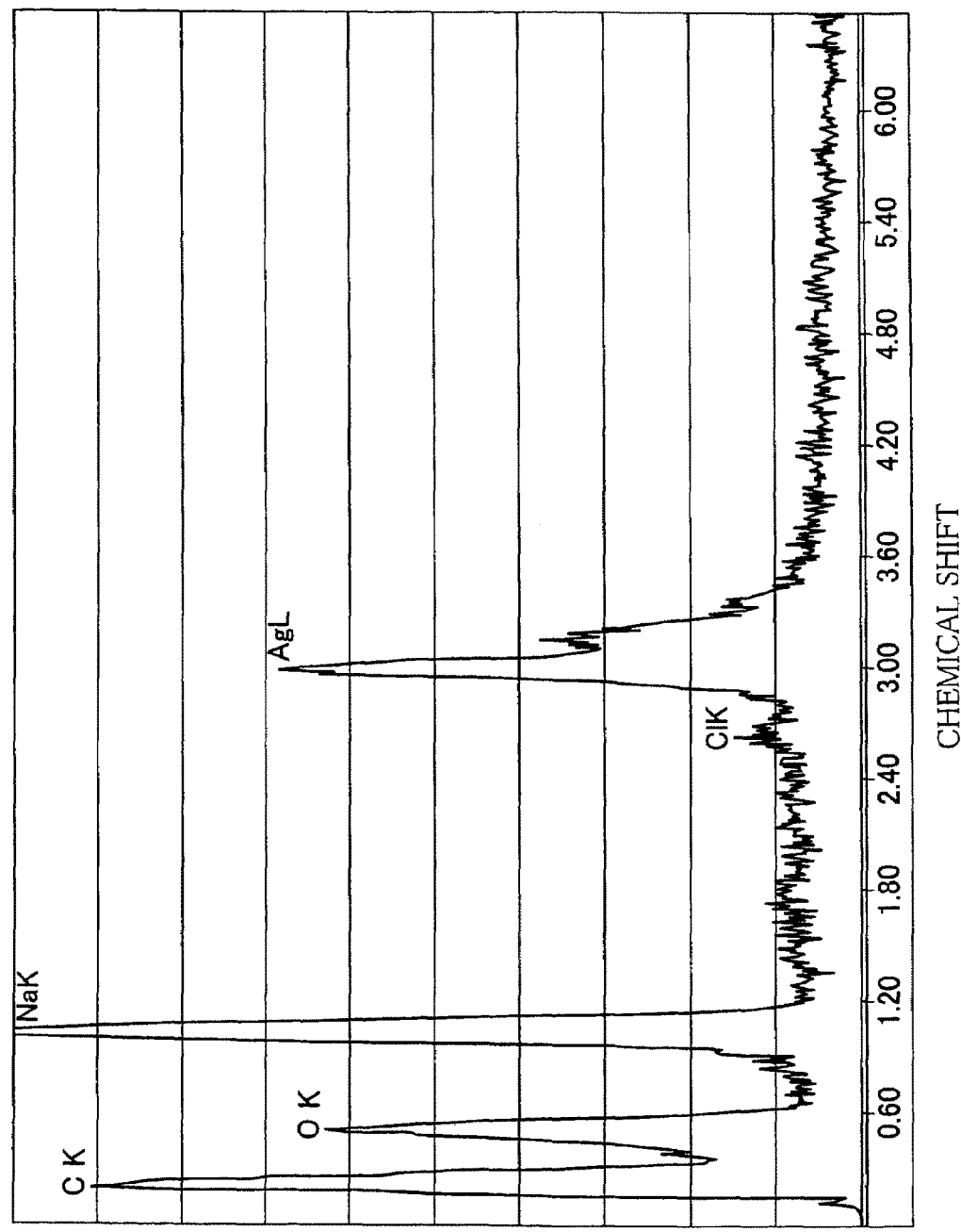
FIG. 7 is a chart illustrating a result of EPMA analysis for silver polymuconate obtained by silver ion exchange reaction using a methanol solution containing a low concentration of silver nitrate.

In EPMA analysis of the crystalline organic polymer (crystal of 2,5-silver polymuconate) after the ion exchange reaction, the peak derived from the silver ion appeared clearly but the peak derived from the sodium ions was also found, as illustrated in FIG. 7. Accordingly, it became clear that exchange ratio of sodium ions with silver ions is higher in Example 4 compared with that in Example 5.

Example 6

2,5-silver polymuconate obtained in Example 4 was irradiated by using a high-pressure mercury arc lamp for one hour so as to conduct photoreduction of the silver ion. As a result, silver fine particles were produced. This changes color of the crystalline organic polymer into deep purple. Therefore it was confirmed that the crystalline organic polymer with dispersed silver fine particles in the crystals of 2,5-polymuconic acid (i.e. polymer with dispersed fine silver particles) was obtained.

Figure 9:
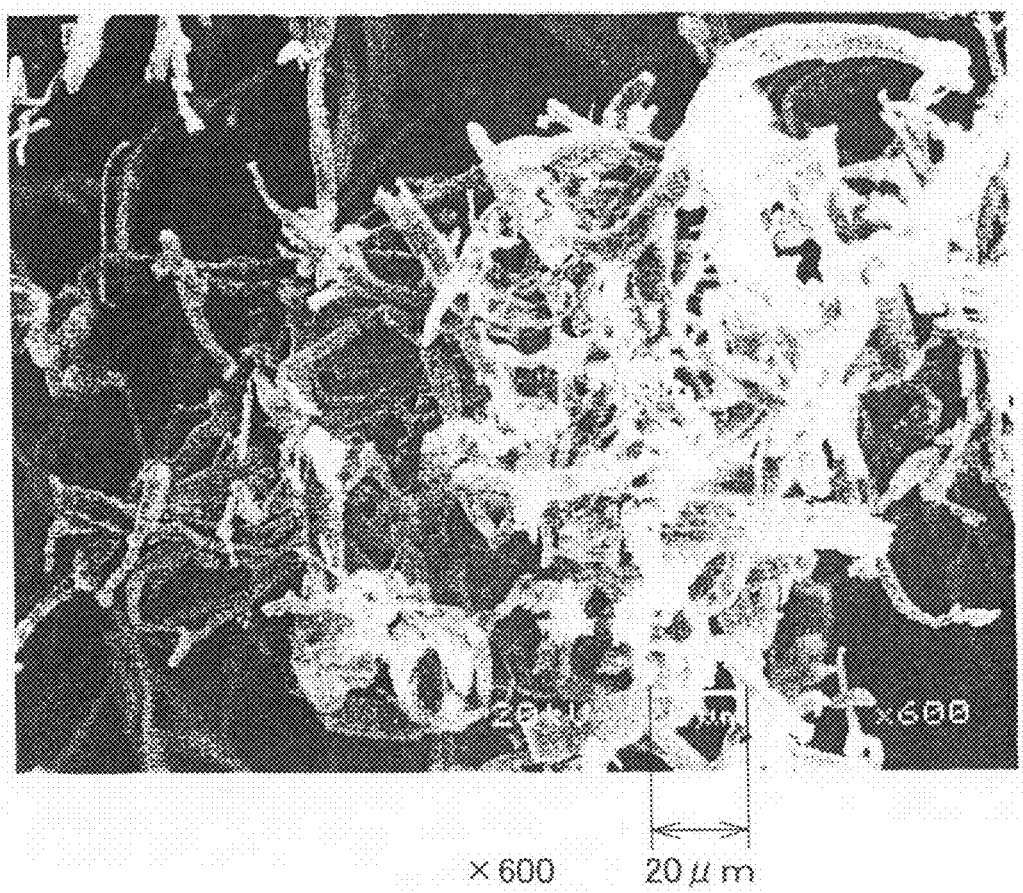
FIG. 9 shows an SEM image of a crystalline organic polymer with dispersed fine silver particles. (magnification ×600)

In an SEM image (photomicrograph of a scanning electron microscope) of a polymer with dispersed fine silver particles, a fibrous polymer structure was observed as in FIG. 9, so that the needle-shaped crystalline state of the benzyl ammonium polymuconate as a starting material was confirmed to be retained even after silver ions being converted into silver fine particles.

Figure 10:
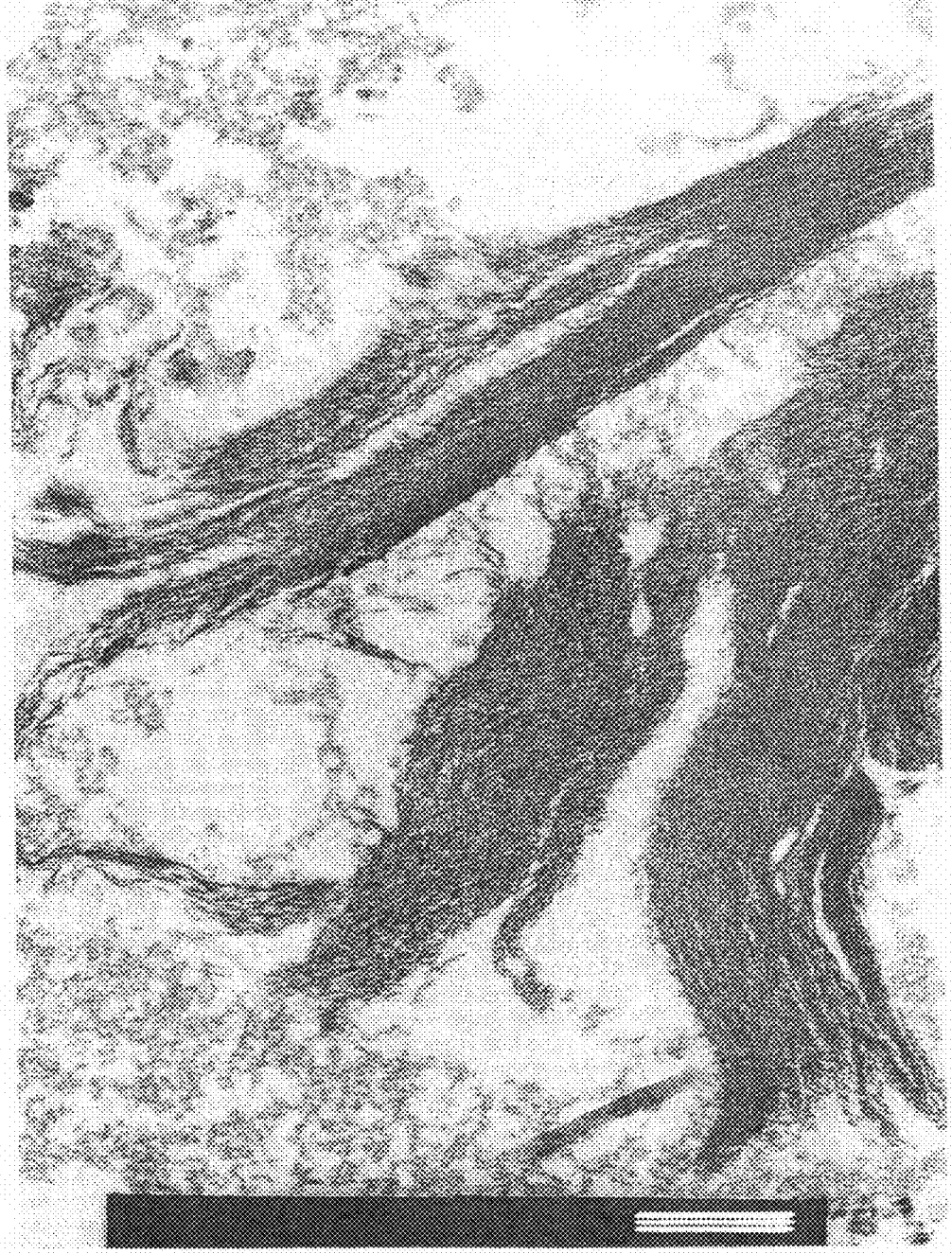
FIG. 10 shows a TEM image of the crystalline organic polymer with dispersed fine silver particles. (magnification ×20000)
Figure 11:
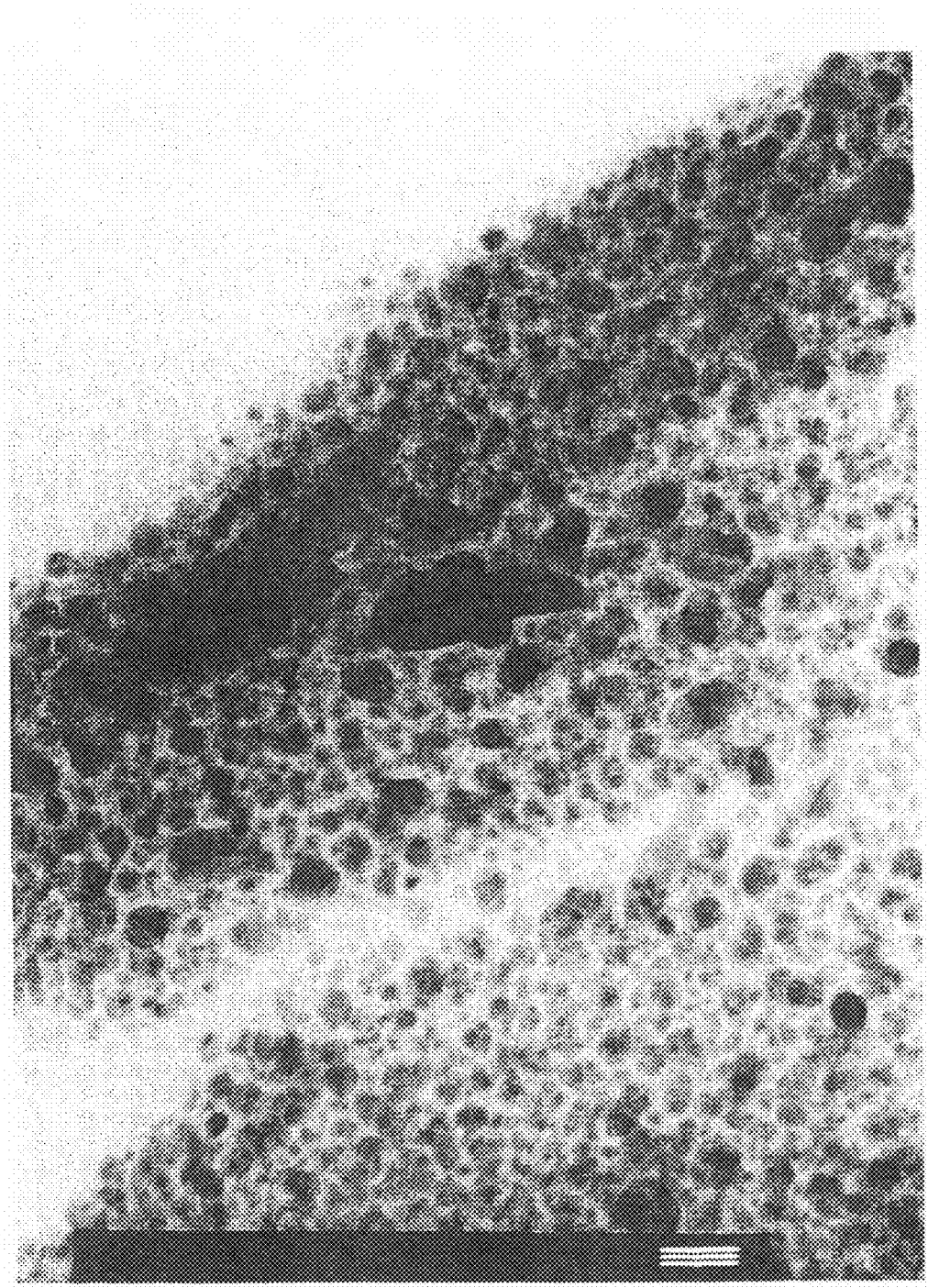
FIG. 11 shows a TEM image of the crystalline organic polymer with dispersed fine silver particles. (magnification ×500000)

In a TEM image (photomacrograph of a transmission electron microscope) of a polymer with dispersed fine silver particles with a low magnification, the needle-shaped crystal portion of the polymer with dispersed fine silver particles, i.e., the portion of the crystalline organic polymer was confirmed as a deep colored portion, as illustrated in FIG. 10. In addition, in a TEM image illustrating, with magnification, the portion of the crystalline organic polymer of the polymer dispersed with the silver particles, many black silver fine particles were found, as illustrated in FIG. 11. From the TEM image, it was confirmed that the silver fine particles were dispersed homogeneously in the entire crystalline organic polymer. Further, it was showed that their diameters were from about several nanometers to over ten nanometers. It was supposed that the silver fine particles were prevented from growing excessively under the production of the silver fine particles through photoreduction in the crystalline organic polymer.

Figure 12:
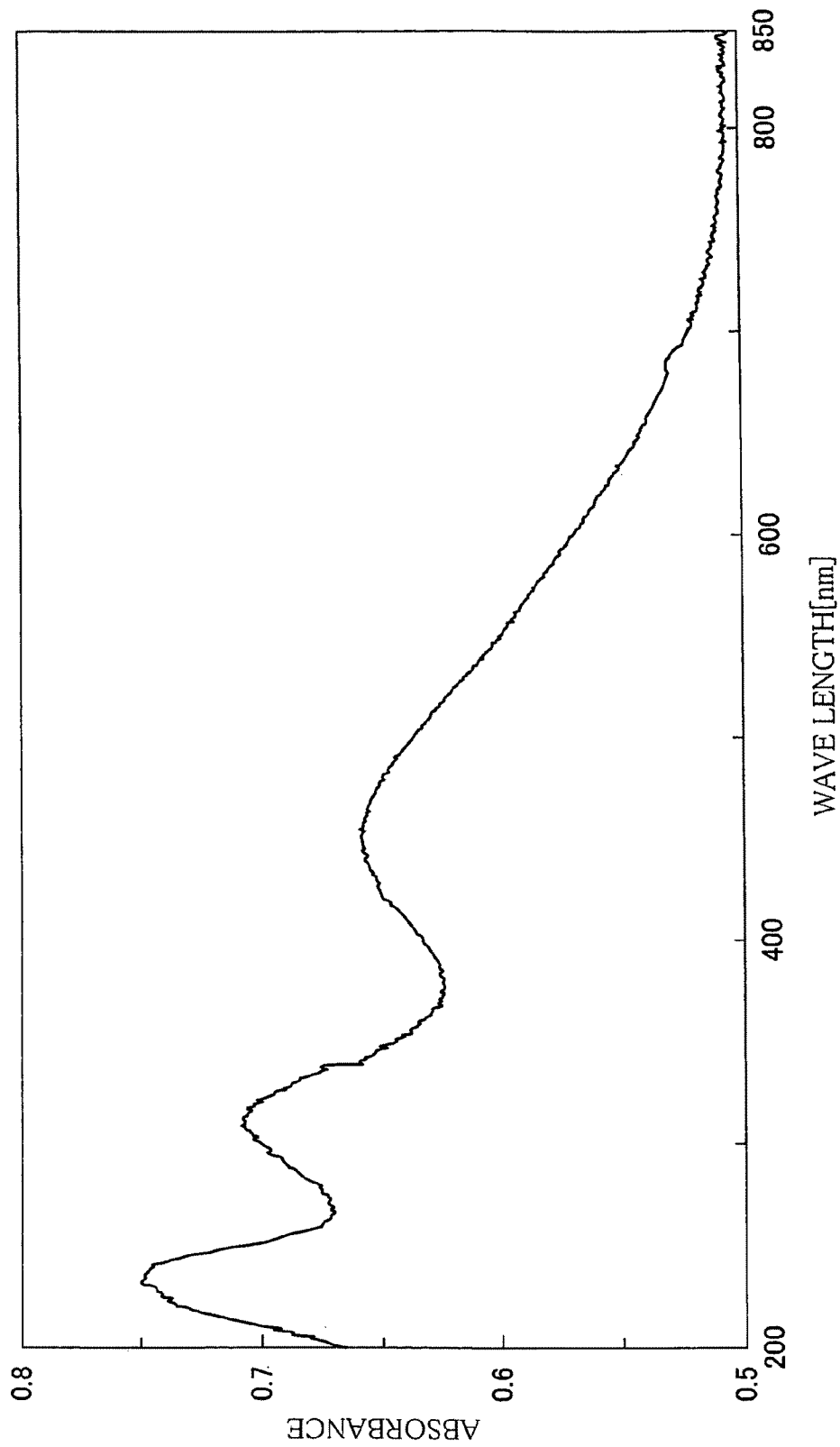
FIG. 12 is a graph illustrating ultraviolet-visible region diffuse reflection spectrum of the crystalline organic polymer with dispersed fine silver particles.

In a ultraviolet-visible region diffuse reflection spectrum obtained from the crystalline organic polymer with dispersed fine silver particles, absorption was observed in the visible areas (in the areas about 450 nm) due to the production of the silver fine particles, as illustrated in FIG. 12.

The specific embodiments or examples in the preferred embodiments are merely exemplary in nature to illustrate the present invention and do not in any way limit the scope of the invention. Thus variations that do not depart from the spirit and from the following claims are intended to be within the scope of the invention.

INDUSTRIAL APPLICABILITY

As mentioned above, according to the present invention, it is possible to provide a novel polymer with dispersed fine metal particles in which nano-sized fine metal particles are dispersed in an organic polymer and which has various advantageous properties compared with the conventional organic/inorganic composite materials containing amorphous or partial crystalline organic polymers.

In other words, the polymer with dispersed fine metal particles of the above-mentioned arrangement is regarded to have high antibacterial activity and high catalytic activity, because it contains fine metal particles, and can be suitably used as an antibacterial agent, antifungal agent, oxidation catalyst, reaction catalyst and the like. In addition, the polymer with dispersed fine metal particles of the above-mentioned arrangement is suitable for an optical material or electronic material because the polymer with dispersed fine metal, particles show characteristic absorption properties in visible areas depending on the size of the fine metal particles in which they are produced.

Furthermore, the present invention provides a polymer with dispersed fine metal particles as an improved organic/inorganic composite material which is more advantageous in thermostability, flame retardance, elastic constant, tensile strength, flexural strength, impact resistance, mar resistance, linear expansion coefficient, dimensional stability, shaping processability, electric properties, dielectric breakdown strength, dielectric constant, properties under high temperature, weatherability, resistance against hydrolysis and the like, compared with the conventional organic/inorganic composite materials containing amorphous or partial crystalline organic polymers.

According to the present invention, it is also possible to provide a novel metal ion-containing polymer which is suitable as an intermediate product used in the production of the polymer with dispersed fine metal particles and which is applicable to a variety of applications.

The metal ion-containing polymer itself is also applicable as an antibacterial agent, antifungal agent, oxidation catalyst, reaction catalyst, optical material, electronic material and the like. The metal ion-containing polymer provides improved properties in thermostability, flame retardance, elastic constant, tensile strength, flexural strength, impact resistance, mar resistance, linear expansion coefficient, dimensional stability, shaping processability, electric properties, dielectric breakdown strength, dielectric constant, properties under high temperature, weatherability, resistance against hydrolysis and the like, compared with conventional organic/inorganic composite materials with amorphous or partial crystalline organic polymers.

The invention claimed is:

1. A polymer with dispersed fine metal particles in which fine metal particles are dispersed in an organic polymer, wherein:
    said polymer with dispersed fine metal particles is obtained by preparing a metal ion-containing polymer having a structure in which the metal ion is intercalated between layers of a lamellar crystalline organic polymer, by mixing the lamellar crystalline organic polymer with a substance containing the metal ion, said substance containing the metal ion being a metal hydroxide, said mixing being conducted by impregnating or dispersing said lamellar crystalline organic polymer in a methanol solution containing said hydroxide; and
    reducing the metal ion in said metal ion-containing polymer so as to obtain the fine metal particles wherein the lamellar crystalline organic polymer is made by tomochemical polymerization and is either a polymer of muconic acid or a polymer of muconic acid benzylammonium.

2. A polymer with dispersed fine metal particles according to claim 1, wherein the fine metal particles are at least one type of particles selected from transition metals.

3. A polymer with dispersed fine metal particles according to claim 1, wherein the fine metal particles are at least one type of particles selected from the group consisting of silver, gold and platinum group elements.

4. A metal ion-containing polymer having a structure in which metal ion is intercalated between the layers of a lamellar crystalline organic polymer having an acidic group preparing a metal ion-containing polymer having a structure in which the metal ion is intercalated between layers of a lamellar crystalline organic polymer, by mixing the lamellar crystalline organic polymer with a substance containing the metal ion, said substance containing the metal ion being a metal hydroxide, said mixing being conducted by impregnating or dispersing said lamellar crystalline organic polymer in a methanol solution containing said hydroxide.

5. A metal ion-containing polymer according to claim 4, wherein the metal ion is at least one kind of metal ions selected from the group consisting of alkali metals, silver, gold and platinum group element.

6. A metal ion-containing polymer according to claim 4, wherein the metal ion is at least one kind of metal ions selected from the group consisting of alkali metals, silver, gold and platinum group element.

* * * * *